United States Patent
Fernholm

(10) Patent No.: US 10,377,185 B2
(45) Date of Patent: Aug. 13, 2019

(54) STUD UNIT FOR A STUDDED TYRE, A STUDDED TYRE, A DEVICE FOR REMOTELY ADJUSTING A STUDDED TYRE, VEHICLE AND OPERATION OF DEVICE

(71) Applicant: Mikael Fernholm, Västerås (SE)

(72) Inventor: Mikael Fernholm, Västerås (SE)

( * ) Notice: Subject to any disclaimer, the term of this patent is extended or adjusted under 35 U.S.C. 154(b) by 836 days.

(21) Appl. No.: 14/898,267

(22) PCT Filed: May 22, 2014

(86) PCT No.: PCT/SE2014/050630
§ 371 (c)(1),
(2) Date: Dec. 14, 2015

(87) PCT Pub. No.: WO2014/200409
PCT Pub. Date: Dec. 18, 2014

(65) Prior Publication Data
US 2016/0144669 A1     May 26, 2016

(30) Foreign Application Priority Data

Jun. 12, 2013    (SE) ...................................... 1350718

(51) Int. Cl.
*B60C 11/16*      (2006.01)

(52) U.S. Cl.
CPC ...... *B60C 11/1618* (2013.01); *B60C 11/1606* (2013.01); *B60C 11/1612* (2013.01)

(58) Field of Classification Search
CPC ............. B60C 11/1606; B60C 11/1612; B60C 11/1618
See application file for complete search history.

(56) References Cited

U.S. PATENT DOCUMENTS

| | | | | |
|---|---|---|---|---|
| 4,246,567 A | * | 1/1981 | Miller | B60C 23/20 200/61.23 |
| 2009/0151441 A1 | * | 6/2009 | Yim et al. | B60C 23/00 73/146.2 |
| 2009/0184815 A1 | * | 7/2009 | Suzuki | B60C 23/0408 340/447 |

FOREIGN PATENT DOCUMENTS

| | | |
|---|---|---|
| EP | 2 199 113 A1 | 6/2010 |
| JP | 59-230811 A | 12/1984 |
| JP | 64-022603 A * | 1/1989 |
| JP | 64-22603 A | 1/1989 |

(Continued)

OTHER PUBLICATIONS

Machine translation for Japan 64-022603 (Year: 2018).*
Machine translation for Japan 02-258403 (Year: 2018).*

*Primary Examiner* — Steven D Maki
(74) *Attorney, Agent, or Firm* — Dilworth & Barrese, LLP

(57) ABSTRACT

A stud unit (3) and a device (1) for a studded tire. The stud unit comprises a housing (5) with a chamber (7) enclosing a medium, a stud (20) arranged at least partly inserted into the chamber so that it is affected by the medium. The stud is adapted to be moved depending on a change of the pressure of the medium in the chamber between a first position for a first pressure and a second position, where the second pressure is higher than the first pressure. In the second position a part of the stud protrudes further from the chamber than in the first position, The stud unit also contains a heating element (22) adapted to heat the medium so that the pressure in the chamber is adjusted between the first pressure and the second pressure.

14 Claims, 2 Drawing Sheets

(56) References Cited

FOREIGN PATENT DOCUMENTS

| | | | |
|---|---|---|---|
| JP | 64-22604 A | | 1/1989 |
| JP | 02-258403 A | * | 10/1990 |
| JP | 4-193612 A | | 7/1992 |

* cited by examiner

STUD UNIT FOR A STUDDED TYRE, A STUDDED TYRE, A DEVICE FOR REMOTELY ADJUSTING A STUDDED TYRE, VEHICLE AND OPERATION OF DEVICE

FIELD OF THE INVENTION

The present invention relates to a remotely adjustable stud unit for a studded tyre and a device for remotely adjusting a stud unit.

The present invention also relates to a vehicle containing the device for remotely adjusting the stud unit and use of the device for controlling the stud unit.

PRIOR ART

Known devices for remotely adjusting studs in a studded tyre requires that the stud units are arranged in tyres with air channels to each stud unit. Adjustment is achieved by for example compressed air.

A problem with prior art devices is that the adjustment of the tyres' stud position requires that the user stops and gets out of the vehicle in order to manually adjust each studded tyre. Another problem with prior art devices is that the stud units can only be used in specially designed tyres.

SUMMARY OF THE INVENTION

One purpose of the present invention is to provide an adjustable stud unit and device that allows the driver to remotely adjust the stud's position on the stud unit while driving the vehicle. Another purpose of the present invention is to provide a simple and inexpensive adjustable stud unit and device for remotely adjusting the stud unit that solves the problems of prior art devices.

The above purposes are achieved with a stud unit comprising:
- a housing with a chamber enclosing a medium,
- a stud arranged at least partly inserted into the chamber so that it is affected by the mediums wherein the stud is adapted to be moved depending on a change of pressure in the medium in the chamber between a first position for a first pressure and a second position for a second pressure, where the second pressure is higher than the first pressure, wherein in the second position a part of the stud protrudes further out from the chamber than in the first position, and
- a heating element adapted to heat the medium so that the pressure in the medium in the chamber can be adjusted between the first pressure and the second pressure.

The heating element generates heat to the medium which adjusts the pressure of the medium in the chamber between the first position and the second pressure. In this way the stud's position can be adjusted between the first position and the second position.

Preferably the first position relates to a passive position where the stud is positioned so that it comes into contact with the roadway while driving the vehicle. Preferably the second position relates to a use position for the stud where the stud is positioned so that it comes into contact with the roadway. The pressure in the chamber is adjusted from the first pressure to the second pressure by the heating element heating the medium to a temperature above the temperature of the surroundings.

The pressure in the chamber is adjusted from the second pressure to the first pressure by not heating the medium so that the temperature of the medium drops down to the temperature of the surroundings.

One embodiment of the stud is adapted to be moved to an intermediate position between the first position and the second position by adapting the pressure of the medium in the chamber to a level between the first position and the second position. In this way the stud is adaptable to different roadways. Preferably the studs can be adjusted between a number of different protruding positions between the first position and the second position.

In one embodiment of the invention, the stud in the first position is within the said chamber. The first position relates to a position where the stud has no significant contact with the roadway. In one embodiment of the invention, the stud unit comprises:
- a receiver coil adapted to be exposed to a magnetic field from a transducer coil and to induce an input current, wherein the heating element contains a resistance component adapted to receive the input current and to produce heat which heats up the medium in the chamber so that the pressure in the chamber changes from the first position to the second position.

By the heating element containing a resistance component which is connected to the receiver coil it is possible to adjust the production of heat while driving the vehicle.

In one embodiment of the invention the stud unit contains an elastic element adapted so that in the second position it acts on the stud with a force directed towards the chamber. The elastic element has the function of ensuring that the stud shifts back from the second position to the first position when the pressure drops in the chamber.

In one embodiment of the invention the stud unit contains a capacitor, and the receiver coil, resistor and capacitor for the stud unit are connected so that they form a resonance circuit with a resonance frequency.

In one embodiment of the invention the said medium in the chamber is mainly made either of wax with a melting point within the interval 100-300° C. or water.

In one embodiment of the invention the first pressure is within the interval 50-110 Pa.

In one embodiment of the invention the second pressure is within the interval 120 Pa-1 MPa.

The above purposes are also achieved by the stud tyre containing one or more stud units according to some of the claims 1-9.

The above purposes are also achieved by the stud tyre containing one or more stud units according to the description herein.

The above purposes are also achieved with a device for remotely adjusting a stud tyre. The device includes one or more stud units in a stud tyre, wherein the device also contains:
- a transducer coil adapted to receive an output current from a power source and to generate a magnetic field,
- a control unit adapted to adjust the output current from the power source to the transducer coil, wherein the receiver coil is adapted to be exposed to the said magnetic field and to induce an input current, and wherein the resistor is adapted to receive the said input current and to develop heat that heats up the medium in the chamber so that the pressure in the chamber is changed from the first pressure to the second pressure.

The device is adapted to generate a magnetic field that exposes the receiver coil for the stud unit so that heat is generated by the heating element. Through the control unit the development of heat from the heating unit to the medium in the chamber is adjustable so that the studs can be adjusted between the first and second position.

In this way the user has the ability to control when the stud is changed between the first position and the second position.

In one embodiment of the invention the transducer coil is adapted to receive the output current in the form of an alternating current so that an alternating magnetic field is generated that penetrates the receiver coil for the stud units. The alternating magnetic field is arranged to spread so that the receiver coil is exposed which in turn induces a current which is used in the heating element to generate heat to the medium. In this way the pressure in the chamber is changed from the first pressure to the second pressure.

In one embodiment of the invention the stud units are arranged into one contact surface on the studded tyre, wherein the transducer coil is orientated so that only part of the said contact surface is exposed to the static magnetic field. Preferably the sensor coil is adapted to receive a continuous current from the power source so that a static magnetic field is generated.

By the transducer coil being oriented so that only a part of the contact surface is exposed to the magnetic field when the vehicle is being driven the stud unit upon a rotation of the studded tyre is alternately exposed to the magnetic field. In this way a static magnetic field can also be used to induce the current in the receiver coil which is then used to produce heat to the medium so that the pressure in the chamber is changed from the first pressure to the second pressure.

The above purposes are also achieved by a vehicle containing a device and using a device according to the description herein.

BRIEF DESCRIPTION OF THE DRAWINGS

The invention will now be explained in more detail through a description of the different embodiments of the invention and with reference to the attached drawings.

DETAILED DESCRIPTION OF PRESENTED EMBODIMENTS OF THE INVENTION

Figure 1:
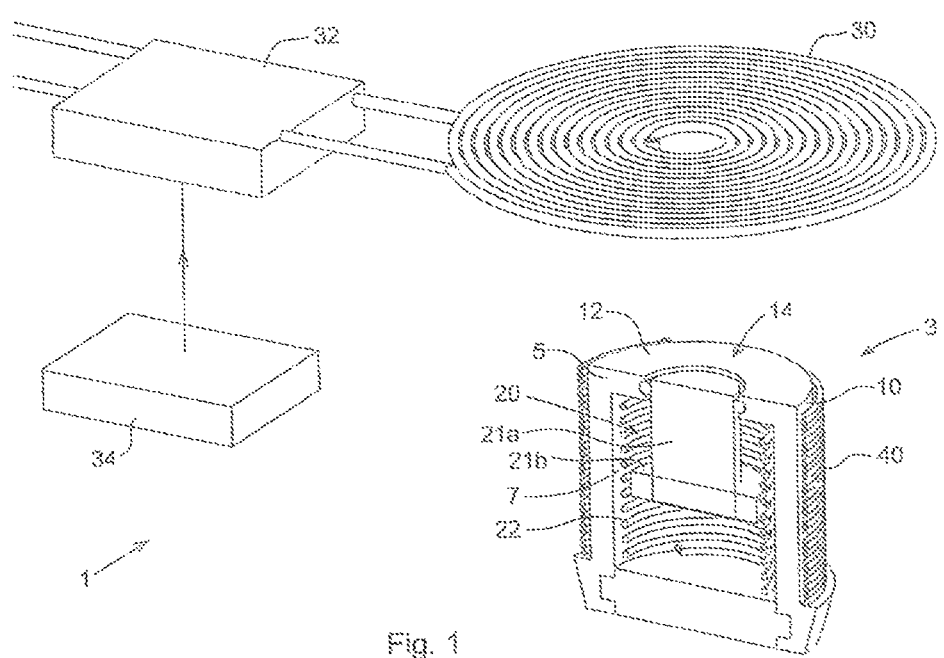
FIG. 1 shows a device for remotely adjusting a stud in a stud unit, where the stud is in a first position.

FIG. 1 shows a device 1 for remotely adjusting a stud in a stud tyre for a vehicle. The device includes a number of stud units 3 which are adapted to be arranged into a contact surface on a stud tyre. FIG. 1 only shows a stud unit 3 and a device 1.

FIG. 1 shows a cross-section of the stud unit 3 with the aim of illustrating the structure of the stud unit 3 in one embodiment of the invention. The stud unit 3 comprises a housing 5 with a chamber 7 which contains a medium.

The housing 5 basically has a cylindrical design containing a cylindrical enveloping surface 10 and a flat upper base surface 12. The chamber 7 also has a basic cylindrical design. The upper base surface 12 has an opening 14 which leads into the chamber 7.

The stud unit 3 also contains a stud 20. In the displayed embodiment the stud 20 comprises a solid cylinder 21a attached to a plate 21b designed in line with the shape of the chamber's 7 spread.

The stud 20 is arranged at least partly inserted into the chamber 7. In this way the part of the stud 20 which is within the chamber 7 of the medium is affected. In the shown embodiment the medium acts on the plate 21b.

The stud 20 is arranged to be shiftable between a first position and a second position through a change in pressure of the medium in the chamber 7 between a first pressure and a second pressure.

FIG. 1 shows the stud 20 in the first position. In the first position the stud 20 is inserted into the chamber 7 so that the stud 20 is in line with or inserted below the upper base surface 12 of the housing 5, which means that the stud 20 does not protrude from the chamber 7. In this way the stud 20 will have no significant contact with the roadway when the vehicle is being driven. The stud 20 therefore endures no or negligible wear on the roadway. In this way when the stud 20 is in the first position the studded tyre acts in the same way as a tyre without studs 20.

Figure 2:
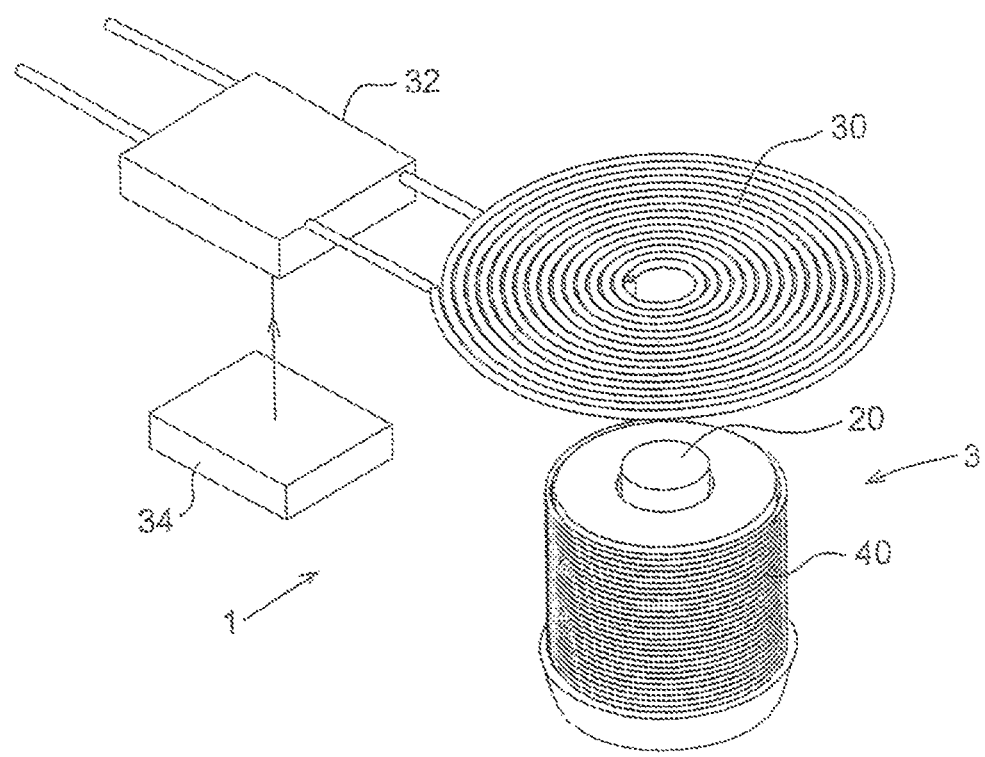
FIG. 2 shows the device in FIG. 1, where the stud is in a second position.

FIG. 2 shows the stud 20 in the second position, In the second position the stud 20 protrudes from the chamber 7. In this way the stud 20 comes into contact with the roadway when the vehicle is being driven which provided the studded tyre with better road grip on slippery roadways. In this way when the stud 20 is in the second position the studded tyre acts in the same way as a tyre with studs 20.

In one embodiment of the invention the stud 20 is adapted to be moved to one or more intermediary positions between the first and the second position through the pressure in the chamber 7 being adjusted to a pressure between the first pressure and the second pressure.

The stud unit 3 also contains a heating element 22 which is in contact with the medium in the chamber 7. The heating element 22 is adapted to produce heat so that the pressure of the medium in the chamber 7 changes from the first pressure to the second pressure. Preferably the heating element 22 is a resistance component adapted to convert electric power into heat. The resistance component is for example a resistor, a resistance wire, etc.

Preferably the stud unit 3 is arranged so that the first pressure occurs at a temperature of room temperature or under room temperature and the second pressure at a temperature above room temperature.

The device 1 contains a transducer coil 30 arranged at a distance from the stud unit 3, as itch 32 and a control unit 34. The transducer coil 30 is connected via the switch 32 to a power source, such as a vehicle battery. The power source is not shown in the figures. The device 1 also contains a receiver coil 40 arranged by the housing 5 for the stud unit 3. The receiver coil 40 is the electrical connection to the heating element 7.

The control unit 34 is adapted to control the switch 32 so that the transducer coil 30 is supplied with an output current so that a magnetic field is created that spreads so that the receiver coil 40 is exposed to the magnetic field. The receiver coil 40 is adapted so that upon exposure to the magnetic field it induces an input current which is used by the heating element 22 to produce heat to the medium so that the pressure is changed from the first pressure to the second pressure, which results in the stud 20 protruding from the first position to the second position.

The stud 20 is moved from the second position till the first position by the control unit 34 controlling the switch 32 so that the connection between the transducer coil 30 and the power source is broken. In this way the transducer coil 30 generates no magnetic field and accordingly no current is induced in the receiver coil 40 and no heat is produced by the heating element 22. In this way the temperature of the medium in the chamber 7 drops to room temperature or under room temperature, which results in the stud 20 shifting from the first position to the second position.

In one embodiment the switch 32 comprises the means to convert the current from the power source so that the transducer coil 30 is supplied with the output current in the form of an alternating current that results in the transducer coil 30 generating an alternating magnetic field. When the receiver coil 40 is exposed to the alternating magnetic field from the transducer coil 30 the input current is induced in the receiver coil 40 which is conducted to the heating element 22, which results in the heating element 22 producing heat to the medium so that the pressure in the chamber 7 changes from the first pressure to the second pressure.

In one embodiment the device 1 is designed so that the stud unit 3 is arranged into a contact surface on the studded tyre for contact between the stud tyre and the roadway. The transducer coil 30 is orientated so that only a part of the said contact surface is exposed to the magnetic field when the vehicle is being driven, which results in the stud unit 3, upon rotation of the studded tyre, being alternately exposed to the magnetic field. In this way it is possible to use a static magnetic field in order to induce the current in the receiver coil 40 which is used to produce heat for the medium.

According to one embodiment the stud unit 3 contains a capacitor (not shown in the illustrations) arranged into a circuit comprising the receiver coil 40 and the heating element 22, which results in the receiver coil 40 the heating element 22 in the form of a resistance component and the capacitor together forming a resonance circuit with a resonance frequency.

The resonance frequency is set by adapting the characteristics of any of the receiver coil 40, the heating element 22 and capacitor.

In one embodiment the stud unit 3 contains an elastic element (not shown in the figures). The elastic element is adapted so that in the second position it acts on the stud 20 with a force directed towards the chamber 7. In this way the stud 20 is assured to be shifted from the first position to the second position when the temperature in the chamber 7 drops so that the pressure changes from the first pressure to the second pressure.

The medium is for example wax with a melting point within the interval 100-300° C. or water. The device 1 is adapted to generate a magnetic field by means of a transducer coil 30 inducing an input current in the receiver coil 40 of sufficient size to heat the medium so that the second pressure arises. Preferably the first pressure is within the interval 50-110 Pa and the second pressure is within the interval 120 Pa-1 MPa.

The invention is not limited to the shown embodiments but can be modified and varied within the scope of the following patent claims.

The invention claimed is:

1. A device for controlling a studded tire, wherein the device includes a stud unit comprising:
    a housing with a chamber enclosing a medium,
    a stud at least partly inserted into the chamber to be affected by the medium,
    the stud positioned to be movable depending on a change in pressure of the medium in the chamber between a first position for a first pressure and a second position for a second pressure,
    the second pressure being higher than the first pressure,
    in the second position a part of the stud protruding further out from the chamber than in the first position,
    a heating element arranged to heat the medium to adjust the pressure of the medium in the chamber between the first pressure and the second pressure,
    a transducer coil arranged to receive an output current from a power source and generate a magnetic field,
    a receiver coil positioned to be exposed to the magnetic field from the transducer coil and induce an input current,
    a control unit arranged to adjust the output current from the power source to the transducer coil,
    the heating element being arranged to receive said input current induced by the receiver coil and generate heat to heat the medium in the chamber to change the first pressure to the second pressure,
    the transducer coil is arranged at a distance from the receiver coil which is arranged at the housing, and
    the housing is cylindrical in shape, the heating element is arranged within the chamber to be in direct contact with the medium within the chamber, and the receiver coil is wrapped around an outer side of the housing opposite the chamber.

2. The device according to claim 1, wherein the stud comprises a solid cylinder attached to a plate arranged to be acted upon by the medium within the chamber.

3. The device according to claim 1, wherein the stud is arranged to be movable to an intermediate position between the first position and the second position by controlling the pressure of the medium in the chamber to a level in between the first pressure and the second pressure.

4. The device according to claim 1, wherein in the first position the stud is within said chamber.

5. The device according to claim 1, wherein the heating element contains a resistance component arranged to receive the input current and produce the heat which heats up the medium in the chamber to change the pressure in the chamber from the first pressure to the second pressure.

6. The device according to claim 5, wherein the stud unit includes an elastic component arranged, in the second position, to act on the stud with a force directed towards the chamber.

7. The device according to claim 5, wherein the stud unit includes a capacitor, and
    the receiver coil, the resistance component and the capacitor for the stud unit are connected to form a resonance circuit with a resonance frequency.

8. The device according to claim 1, wherein said medium in the chamber is either wax with a melting point within the interval 100-300° C. or water.

9. The device according to claim 1, wherein the first pressure is within the interval 50-110 Pa.

10. The device according to claim 1, wherein the second pressure is within the interval 120 Pa-1 MPa.

11. A studded tyre having a device according to claim 1 for controlling the studded tyre.

12. The device according to claim 1, wherein the transducer coil is arranged to receive the output current in the form of an alternating current and generate an alternating magnetic field which penetrates the receiver coil for the stud.

13. The device according to claim 1, wherein the stud unit is arranged into a contact surface on the studded tyre, and the transducer coil is oriented with only a part of said contact surface exposed to the magnetic field.

14. A vehicle containing a device according to claim 1.

* * * * *